United States Patent

Stites

[11] 4,451,832
[45] May 29, 1984

[54] RADIO FREQUENCY TRANSMITTER COUPLING CIRCUIT

[75] Inventor: Francis H. Stites, Wayland, Mass.

[73] Assignee: GTE Products Corporation, Stamford, Conn.

[21] Appl. No.: 360,878

[22] Filed: Mar. 22, 1982

[51] Int. Cl.³ .............................................. H01Q 5/00
[52] U.S. Cl. ................................. 343/858; 455/103; 455/129
[58] Field of Search ................ 343/858; 333/1.1, 110, 333/24.1, 24.2, 24.3; 455/277, 129, 103, 101

[56] References Cited

U.S. PATENT DOCUMENTS

| | | | |
|---|---|---|---|
| 3,099,794 | 7/1963 | Essam et al. | 333/24.3 |
| 3,714,661 | 1/1973 | Kershaw | 343/858 |
| 3,928,806 | 12/1975 | Carter et al. | 455/129 |
| 4,206,464 | 6/1980 | Hirsch | 333/1.1 |

Primary Examiner—Eli Lieberman
Assistant Examiner—Karl Ohralik
Attorney, Agent, or Firm—John F. Lawler

[57] ABSTRACT

An efficient circuit for coupling at least two radio frequency transmitters of arbitrary power and frequency to one antenna comprises a three-port ferrite circulator connected to the output of each transmitter, a tee connector with a predetermined impedance mismatch connected to the first output port of each circulator, a first in-phase power combiner connected to the second output port of each circulator, and a second in-phase power combiner connected to the outputs of the tee connector and first combiner for adding the RF power and feeding the attached antenna. The impedances of transmission lines connected to the tee connector are selected to present a 3 to 1 voltage standing wave ratio to input lines so that reflected power is equally divided and fed in segments of equal power, phase and amplitude to that of the original summation for recombining and delivery to the antenna. The circuit effectively isolates the transmitters from each other and combines their outputs with high efficiency and minimum loss.

11 Claims, 2 Drawing Figures

RADIO FREQUENCY TRANSMITTER COUPLING CIRCUIT

RELATED APPLICATION

Ser. No. 360,877, filed Mar. 22, 1982.

BACKGROUND OF THE INVENTION

This invention relates to transmitter-antenna coupling circuits and more particularly to a circuit for coupling a plurality and radio frequency transmitters to a single antenna.

In accordance with prior practice the technique used to combine the outputs of several transmitters without great sacrifice in efficiency is to isolate the transmitters with a frequency selective network such as a diplexer. This has been the practice with TV sound and picture transmitters and in some cases with an additional FM transmitter. Such conventional combining techniques are described in an article entitled "Using Cavities and/or Ferrites in Combiners and Multicouplers," Communications News, June 1977, pages 24–27, inclusive.

An alternate and less desirable approach is to use separate antennas but this usually requires the use of frequency selective filters to isolate the transmitters from each other in order to prevent generation of intermodulation products. In some cases ferrite isolators are used to augment or replace the filters. The obvious disadvantage of this approach is that in many applications there is no room for many isolated antennas.

Less efficient methods use a single large linear amplifier with multiple inputs, or separate transmitters with conventional lossy hybrid combiners. These two methods consume great amounts of power and still generate significant spurious output signals.

The disadvantages of prior techniques are most serious when frequent or rapid frequency change is required of a group of co-located transmitters. In such cases, the filter techniques become impractical. For example, sixteen 40-watt signals using the common linear amplifier approach would require an amplifier with a 10,240 peak watt capability operating Class A. Based on a 26% efficiency single channel design, this would require a continuous input of 39,040 watts. Separate transmitters with conventional power combiners would require 16 transmitters of 1280 watts each for a total of 20,480 watts. Based on a 50% efficiency factor, the total power input required would be 40,960 watts.

The coupling circuit employing this invention combines the transmitter outputs with zero theoretical loss so that in the example above sixteen 40-watt transmitters at 50% efficiency would require 640 watts of RF power and 1280 watts input. In practice of course components do not have zero loss and actual power requirements are somewhat higher than the theoretical minimum. Results achievable with the practice of the invention, however, represent a substantial improvement over the prior art.

OBJECTS AND SUMMARY OF THE INVENTION

A general object of the invention is the provision of a circuit for coupling multiple transmitters to a single antenna at much greater efficiency than has been achieved in the past.

A further object is the provision of such a circuit which effectively isolates the transmitters from one another.

Still another object is the provision of such a circuit which avoids inherent power sharing loss in the combining process.

These and other objects of the invention are achieved with a coupling circuit which utilizes the nonreciprocal properties of circulators and a deliberate impedance mismatch at the output juncture of the transmitters that produces a 3 to 1 VSWR so that reflected energy is equally divided and fed in segments of equal power and phase for recombining and feeding to the single antenna.

DESCRIPTION OF PREFERRED EMBODIMENT

Figure 1:
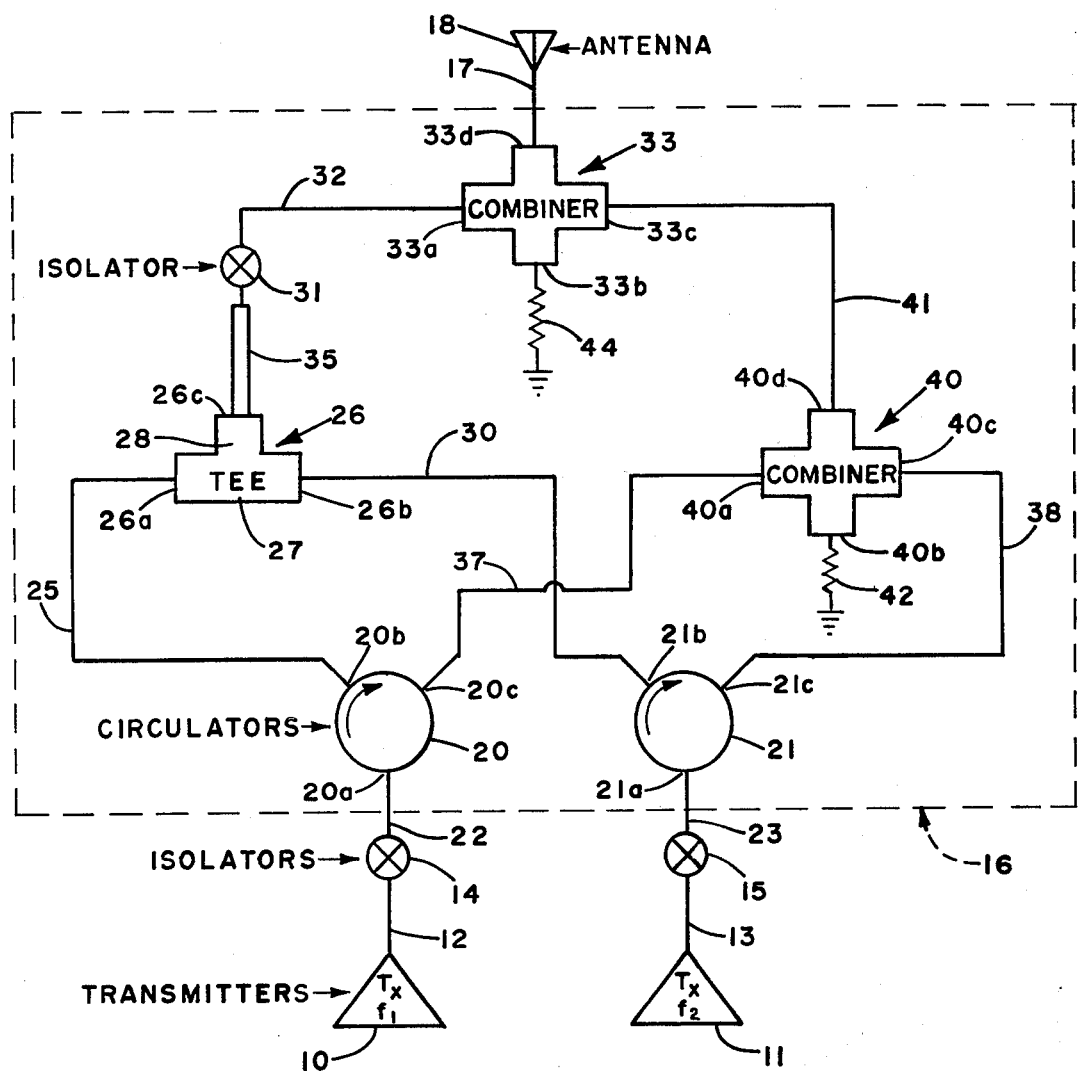
FIG. 1 is a schematic block diagram of a coupling circuit embodying this invention illustrating two transmitters connected to a single antenna.

Referring now to the drawings, FIG. 1 illustrates radio frequency transmitters 10 and 11 having different operating frequencies $f_1$ and $f_2$, respectively, connected by lines 12 and 13 to isolators 14 and 15, respectively, and to a coupling circuit 16 embodying the invention which is connected by line 17 to an antenna 18.

Circuit 16 comprises identical 3-port circulators 20 and 21 having input ports 20a and 21a, respectively, connected by transmission lines 22 and 23 to isolators 14 and 15, respectively. Circulators 20 and 21 also have output ports 20b, 20c, 21b and 21c, respectively. Adjacent ports of each circulator are nonreciprocally connected to each other in the direction of the arrows.

Port 20b of circulator 20 is connected by transmission line 25 to a first input port 26a of a conventional three-port tee junction or connector 26. Connector 26 has a main channel or path 27 terminating in first input port 26a and second input port 26b and has a branch channel 28 which intersects the main channel at right angles and is terminated in output port 26c. Port 26b is connected by line 30 to port 21b of circulator 21 and port 26c is connected through isolator 31 and transmission line 32 to a four-port in-phase power combiner 33. All of the transmission lines interconnecting components in circuit 16 have the same characteristic impedance $Z_o$.

In accordance with this invention, connector 26 deliberately incorporates a voltage standing wave ratio (VSWR) of 3 to 1 so that signals entering ports 26a or 26b "see" the 3 to 1 VSWR causing 25% of the incident signal power on ports 26a and 26b to be reflected backwardly on lines 25 and 30, respectively. The ratio of the power reflected to the incident power is determined by the following relationship:

$$\frac{Pr}{Pi} = \left(\frac{s-1}{s+1}\right)^2$$

where
  Pr=Reflected power
  Pi=Incident power
  s=VSWR
For a 3:1 VSWR, $$\frac{Pr}{Pi} = \left(\frac{3-1}{3+1}\right)^2 \cdot \left(\frac{2}{4}\right)^2 = 0.25$$

Thus a 3 to 1 VSWR reflects 25% of the incident power, leaving 75% to travel to the load. A 3 to 1 VSWR is created at connector 26 by reducing the impedance of line 32 at port 26c to (Zo/2) while the impedances of lines 25 and 30 connected to ports 26a and 26b, respectively, are Zo. Such impedance reduction is accomplished, for example, by a quarter wave section 35 of transmission line connected between isolator 31 and port 26c. Other devices may be used to accomplish this purpose such as a transformer or the like.

Ports 20c and 21c of circulators 20 and 21, respectively, are connected by transmission lines 37 and 38, respectively, to a four-port in-phase power combiner 40. Combiner 40 is a standard circuit component which, as its name implies, combines signal power incident on its ports and produces a sum output at the other of its ports. Combiner 40 has ports 40a, 40b, 40c and 40d and is arranged with lines 37 and 38 connected to input ports 40a and 40c, respectively, and with a sum output port 40d connected by line 41 to combiner 33. The fourth port 40b of combiner 40 is terminated in a load resistor 42.

Combiner 33 has input ports 33a and 33c connected to lines 32 and 41, respectively, and the sum on output port 33d is connected by line 17 directly to antenna 18. The fourth port 33b is terminated in load resistor 44.

In order to insure in-phase summation of RF signals at connector 26 and combiners 33 and 40, the electrical lengths of transmission lines 25, 30, 37 and 38 are equal. In addition, the electrical length of line 32 including section 35 is equal to such length of line 41 plus twice the electrical length of line 25. Furthermore, as mentioned above, the characteristic impedances of lines 25, 30, 32, 37, 38 and 41 are equal.

The operation of the coupling circuit is now explained. Assume for the sake of simplicity and clarity of understanding that each of transmitters 10 and 11 generates 40 watts of power at different frequencies $f_1$ and $f_2$, respectively, and that the components in the circuit are lossless. All the power from transmitter 10 passes from circulator port 20a to port 20b and through line 25 to port 26a of connector 26. The RF energy on line 25 "sees" a 3:1 VSWR at port 26a so that 25% of the incident power, i.e., 10 watts, is reflected back on line 25 to circulator 20b and out port 20c to line 37 and port 40a of combiner 40.

10 watts of the incident power passes through main channel 27 of connector 26, out port 26b, through line 30 to port 21b of circulator 21, out port 21c and via line 38 to port 40c of combiner 40. The remaining 20 watts passes from port 26c of connector 26 through isolator 31 and line 32 to port 33a of combiner 33.

The reflected power (10 watts) incident on each of ports 40a and 40c of combiner 40 is added and the sum (20 watts) passes from port 40d via line 41 to port 33c of combiner 33. The 20 watts on each of lines 32 and 41 are added by combiner 33 to produce 40 watts at port 33d for transmission on line 17 to antenna 18.

The circuit is functionally symmetrical and power from transmitter 11 is propagated, divided and reflected and combined in the same manner as described above to produce the 40 watts of power at frequency $f_2$ to antenna 18.

Since none of the above described components is in fact ideal, undesired coupling will occur. The most serious is the coupling of power from transmitter 11 into transmitter 10 and vice versa. Leakage in the circulators 20 and 21 and reflections back from combiner 40 on lines 37 and 38 produce this coupling. It is the function of isolators 14 and 15 to reduce such coupling to an acceptable level to insure low intermodulation product generation. Imperfect components elsewhere either reflect power back to isolators 14 and 15 or, as in the case with the impedance mismatch at connector 26, cause an unbalance in the reflected and transmitted power in lines 25 and 30 that is partially absorbed in the resistors 42 and 44 of combiners 40 and 33, respectively.

By way of a practical example, the frequency range and bandwidth of the circuit is limited by the available circulators and to a lesser degree by the antenna and the quarter wave impedance transformer 35. A practical lower limit of this frequency range would be 100 MHz and a high limit in the high microwave region. A typical circulator for use in the circuit is the 1001 series manufactured by Eaton Corporation, Addington Solid State Products, 783 Palomar Avenue, Sunnyvale, Calif., having a 300 to 400 MHz bandwidth and a loss of approximately 0.4 dB. Typical hybrid power combiners are Model HJ-0.3K broadband hybrid tee junction manufactured by Merrimac Industries, 41 Fairfield Place, West Caldwell, N.J., having a bandwidth of 200 to 400 MHz and a 0.3 dB loss. Using these values of loss in the described circuit, the two transmitters must deliver 55.6 watts each to produce a 40 watt transmission. Under these nearly symmetrical conditions, little power (0.70 watts) is lost in the combiner resistors and the overall efficiency is approximately 72%.

Figure 2:
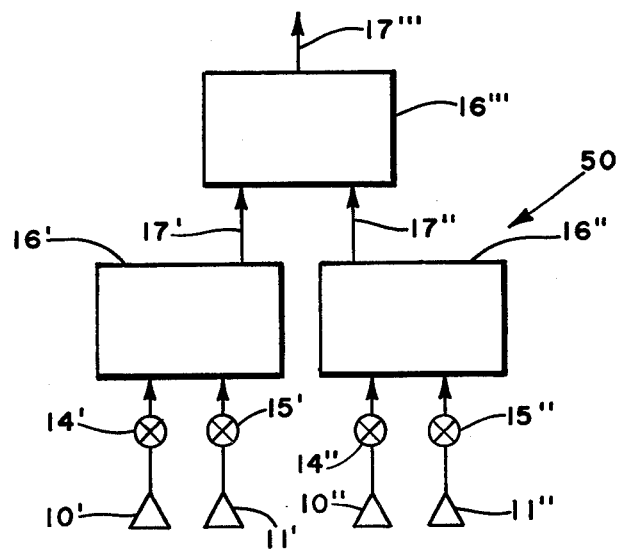
FIG. 2 is a block "tree" diagram illustrating the use of three coupling circuits embodying the invention to couple four separate transmitters to a single antenna.

Since coupler 16 embodying the invention is essentially a "box" that accepts two inputs and delivers a single output, a "tree" can be constructed to combine a plurality of transmitters into a common load. Such a "tree" is illustrated at 50 in FIG. 2 and comprises three coupling circuits 16', 16", and 16'", each identical to circuit 16 described above. Circuits 16' and 16" each receive inputs from two different transmitters as shown and produce single outputs at 17' and 17", respectively, which are directly applied to the circulator input ports of circuit 16'". The single output 17'" from circuit 16'" is applied to the antenna. Since the transmitter-protecting isolators are not needed in circuit 16'", the efficiency of that circuit is higher, i.e., 79%. The combined efficiency for a four-transmitter system is thus 57%.

Unlike similar "tree" type summations of a common frequency, not all of the input transmitters need be present. In the above example, a three-transmitter system could be made by replacing the fourth input with a 50 ohm load. This feature follows from the coupling circuit's acceptance of varying power levels at the inputs.

The utility and advantage of the circuit is not limited to coaxial lines and components. At higher frequencies waveguide or other types of RF construction may be used including stripline at 300 to 400 MHz. In the above described embodiment two equal power transmitters are used. Performance is not impaired, however, by unequal power outputs from the transmitters.

What is claimed is:

1. A circuit for coupling an antenna to the outputs of at least two transmitters comprising first and second circulators, each of said circulators having first, second and third ports nonreciprocally connected in that order, a connector and a first power combiner, said connector and said combiner each having first and second input ports and a third output port, said connector having a predetermined impedance mismatch between said output port thereof and each of said input ports thereof characterized by a 3 to 1 voltage standing wave ratio of said output port thereof relative to said input ports thereof, said combiner producing at said third port thereof the sum of the signal power incident on said first and second ports thereof, the first and second ports of said connector being connected with equal phase delays to the second ports, respectively, of said first and second circulators, the first and second ports of said combiner being connected to the third ports, respectively, of said first and second circulators, with phase delays equal to each other and to each of the first named phase delays, a second power combiner having first and second input ports and a third output port, said second combiner producing at the third port thereof the sum of signal power incident on said input ports thereof, said third ports of said connector and said first combiner being connected to said first and second ports, respectively, of said second combiner, said antenna being connected to said third port of said second combiner.

2. A circuit for connecting at least two RF transmitters having different frequencies to an antenna comprising first and second circulators, each of said circulators having first, second and third ports with said first and second ports being adjacent and said second and third ports being adjacent, adjacent ports of each circulator being nonreciprocally connected, said transmitters being connected to said first ports, respectively, of said circulators, a tee connector having a main channel with first and second ports and a branch channel with a third port, first and second in-phase power combiners, each of said combiners having first, second and third ports arranged to add signal power incident on said first and second ports and produce the sum thereof at said third port, first and second transmission lines having equal impedances and connecting said second ports, respectively, of said first and second circulators to said first and second ports, respectively, of said connector with equal phase delays, third and fourth transmission lines connecting said third ports of said first and second circulators to said first and second ports, respectively, of said first combiner with equal phase delays, fifth and sixth transmission lines connecting said third ports, respectively, of said connector and said first combiner to said first and second ports, respectively, of said second combiner with equal phase delays, and means for creating a predetermined impedance mismatch at said connector between said fifth transmission line and each of said first and second transmission lines whereby to produce a 3:1 voltage standing wave ratio characteristic at the third port of said connector relative to the first and second ports thereof, said antenna being connected to said third port of said second combiner.

3. The circuit according to claim 2 in which said first, second, third and fourth lines have equal electrical lengths, said fifth line having an electrical length equal to the sum of the electrical length of said sixth line and twice the electrical length of said first line.

4. The circuit according to claim 2 with an isolator connected between each circulator and the associated transmitter.

5. The circuit according to claim 2 in which each of said combiners has a fourth port opposite the third port thereof, and a load resistor connected to the fourth port of each combiner.

6. The circuit according to claim 2 in which the impedance of said fifth transmission line at the third port of the connector is one-half of the impedance of each of said first and second transmission lines at the first and second ports, respectively, of said connector.

7. A plurality of circuits for connecting at least four RF transmitters having different frequencies to an antenna, each circuit comprising first and second circulators, each of said circulators having first, second and third ports nonreciprocally connected in that order, a tee connector and a first power combiner, said connector and combiner each having first and second input ports and a third output port, said connector having a predetermined impedance mismatch between said third port thereof and each of said first and second ports thereof characterized by a 3 to 1 voltage standing wave ratio of said third port thereof relative to said first and second ports thereof, said combiner producing at said third port thereof the sum of the signal power incident on said first and second ports thereof, the first and second ports of said connector being connected with equal phase delays to the second ports, respectively, of said first and second circulators, the first and second ports of said combiner being connected to the third ports, respectively, of said first and second circulators with phase delays equal to each other and to each of the first named phase delays, a second power combiner having first and second input ports and a third output port, said second power combiner producing at the third port thereof the sum of the signal power incident on the first and second ports thereof, said third ports of said connector and of said first combiner being connected to said first and second ports, respectively, of said second combiner, the first port of each circulator of at least two of said plurality of circuits being connected to a transmitter, the third port of each second combiner of said two of said circuits being connected to the first port of each circulator of a third of said circuits, the third port of the second combiner of said third circuit being connected to said antenna.

8. A circuit for coupling an antenna to the outputs of plurality of transmitters comprising a like number of circulators each having first, second and third ports with said first and second ports being adjacent and said second and third ports being adjacent, adjacent ports of each circulator being nonreciprocally connected, connector means having a plurality of input ports and an output port, means for connecting said second ports of said circulators to said input ports, respectively, of the connector means with equal phase delays, said connector means being characterized by a capability of combining equal portions of signal power at said input ports into a sum at said output port and reflecting equal segments of said signal power from said input ports, respectively, to said second ports, respectively, of said circulators, power combining means having a plurality of input ports and an output port, and means for connecting said third ports of said circulators and the output port of said connector to said ports, respectively, of said combining means, said antenna being connected to said output port of said combining means.

9. The circuit according to claim 8 in which said connecting means comprise transmission lines, the characteristic impedances of transmission lines connecting said circulators to said connector means and to said combining means being equal.

10. The circuit according to claim 9 in which said lines between said second ports of the circulators and the input ports, respectively, of said connector means having equal electrical lengths, said lines between said third ports of the circulator and the input ports, respectively, of said combining means having equal electrical lengths.

11. The circuit according to claim 10 in which said combining means comprises first and second combiners, said first combiner having input ports connected to said third ports, respectively, of said circulators and having an output port, said second combiner having input ports connected to said output ports, respectively, of said connector means and said first combiner, said output port of said combining means connecting said second combiner to said antenna.

* * * * *